United States Patent
Cydzik et al.

Patent Number: 6,114,004
Date of Patent: Sep. 5, 2000

[54] CAVITY SEALING ARTICLE

[76] Inventors: Edward A. Cydzik, 343 Bluefish Ct., Foster City, Calif. 94404; Peter M. Godfrey, 32328 Pollux Ct., Union City, Calif. 94587; Rong J. Chang, 804 Beaver Ct., Fremont, Calif. 94538; Keith Dawes, 520 Warren Rd., San Mateo, Calif. 94402

[21] Appl. No.: 09/013,400

[22] Filed: Jan. 26, 1998

[51] Int. Cl.⁷ ................................................ F16J 15/02
[52] U.S. Cl. ........................ 428/81; 277/644; 277/650; 428/192; 428/316.6
[58] Field of Search ............................ 277/316, 644, 277/650; 428/81, 192, 316.6

[56] References Cited

U.S. PATENT DOCUMENTS

| | | | |
|---|---|---|---|
| 3,166,332 | 1/1965 | Olson | 277/644 |
| 4,166,890 | 9/1979 | Fried et al. | 521/92 |
| 4,203,815 | 5/1980 | Noda et al. | 204/159.2 |
| 4,874,650 | 10/1989 | Kitoh et al. | 428/68 |
| 4,898,630 | 2/1990 | Kitoh et al. | 156/79 |
| 4,977,018 | 12/1990 | Irrgeher et al. | 277/650 |
| 4,989,913 | 2/1991 | Moore | 296/205 |
| 5,040,803 | 8/1991 | Cieslik et al. | 277/12 |
| 5,091,435 | 2/1992 | Suzuki et al. | 521/134 |
| 5,160,465 | 11/1992 | Soderberg | 264/54 |
| 5,194,199 | 3/1993 | Thum | 264/46.6 |
| 5,212,208 | 5/1993 | Soderberg | 521/96 |
| 5,213,391 | 5/1993 | Takagi | 296/205 |
| 5,266,133 | 11/1993 | Hanley et al. | 156/71 |
| 5,373,027 | 12/1994 | Hanley et al. | 521/84.1 |
| 5,385,951 | 1/1995 | Soderberg | 264/46.6 |
| 5,506,025 | 4/1996 | Otto et al. | 428/98 |
| 5,529,824 | 6/1996 | Walendy et al. | 428/75 |
| 5,545,361 | 8/1996 | Rosasco | 264/45.2 |
| 5,611,549 | 3/1997 | Forry | 277/650 |
| 5,631,027 | 5/1997 | Takabatake | 425/4 R |
| 5,642,914 | 7/1997 | Takabatake | 296/187 |
| 5,649,400 | 7/1997 | Miwa | 52/406.1 |
| 5,677,382 | 10/1997 | Tsuji et al. | 525/237 |
| 5,678,826 | 10/1997 | Miller | 277/1 |
| 5,725,272 | 3/1998 | Jones | 296/208 |
| 5,800,896 | 9/1998 | Kobayashi | 428/67 |
| 5,806,915 | 9/1998 | Takabatake | 296/187 |
| 5,806,919 | 9/1998 | Davies | 296/205 |
| 5,866,052 | 2/1999 | Muramatsu | 264/46.6 |
| 5,931,474 | 8/1999 | Chang et al. | 277/316 |

FOREIGN PATENT DOCUMENTS

| | | |
|---|---|---|
| 0730 999 A1 | 9/1996 | European Pat. Off. |
| WO 93/11001 | 6/1993 | WIPO |

OTHER PUBLICATIONS

Getty's "New Concepts in Acoustical Baffles," Interior and Exterior Systems, International Body Engineering (IBE) Conf., pp. 90–93 (1993).

*Primary Examiner*—Allan R. Kuhns

[57] ABSTRACT

A cavity sealing article comprises
(a) a planar support member; and
(b) a sealing member comprising a foamable polymer surrounding and in intimate contact with the support member in the plane of the support member, the sealing member comprising at least two layers in intimate contact in the plane of the support member,
the outermost of the layers comprising an uncrosslinked foamable polymer, and
an inner layer comprising a crosslinked foamable polymer.

21 Claims, 3 Drawing Sheets

CAVITY SEALING ARTICLE

CROSS-REFERENCE TO RELATED APPLICATIONS

The subject matter of this application is related to the subject matter of U.S. patent application Ser. No. 08/805,387, filed Feb. 24, 1997, U.S. Ser. No. 08/925,422, filed Sep. 8, 1997, and U.S. Ser. No. 08/944,736, filed Oct. 6, 1997. These three applications are incorporated herein by reference in their entirety.

BACKGROUND OF THE INVENTION

This invention relates to sealing articles for cavities, and methods for making and using them. More particularly, this invention relates to sealing articles for channels in automobiles or other land vehicles, boats or other marine vehicles, aircraft or other aerospace vehicles, structures, including land and marine structures, and the like, wherever it is desirable to seal a cavity against the passage of air, moisture, fluids, particulates, and the like. In a particular aspect, this invention relates to the sealing of channels, such as pillars, in the body structure of automobiles and similar vehicles; and the invention will be discussed primarily with respect to that aspect.

During the fabrication of automobiles, trucks, and similar vehicles, many body components present cavities that require sealing to prevent the ingress of moisture and contaminants that can cause corrosion of the body parts. This is especially true with respect to unibody structures, where a heavy frame is replaced by a structurally designed space frame that inherently presents a number of moisture- and contaminant-collecting cavities. These cavities also serve as passages through which road and engine noise and other sounds may be transmitted during normal use of the vehicle. For example, the upright post structure of a vehicle body defining a portion of a window opening presents an elongated cavity that can collect moisture and contaminants and also transmit sounds unless the cavity is at least partially filled with a sealant material that blocks the passage of moisture and debris and that also serves as a baffle for muting sounds that would otherwise be transmitted along the length of the cavity and then radiate into the passenger compartment of the vehicle. There are other irregular cavities in a vehicle body that desirably are sealed to prevent moisture and contaminants from entering that area and being conveyed to other parts of the vehicle body.

Many attempts have been made to seal these cavities; and some techniques and products for this purpose are described in U.S. Pat. Nos. 5,266,133 and 5,373,027 (Hanley et al.), U.S. Pat. Nos. 5,212,208 and 5,160,465 (Soderberg), U.S. Pat. No. 5,040,803 (Cieslik et al.), U.S. Pat. No. 4,989,913 (Moore, III), and U.S. Pat. No. 4,874,650 (Kitoh et al.), among others. The disclosures of these and other documents referred to throughout this application are incorporated herein by reference.

A currently favored technique in automobile cavity sealing is the use of a heat-activated sealing foam material. Typically, a mass of a material capable of expansion (foaming) at elevated temperatures, i.e. a thermoplastic mixture containing both a heat-activated foaming agent and a heat-activated crosslinking agent, is placed on a tray or other mechanical support, usually made from sheet metal or a molded high temperature thermoplastic, that is capable of being mechanically fastened within the cavity. Because automobile bodies are now typically coated by total immersion in phosphating, rustproofing, electrocoating, and other paint baths to ensure that the interiors of all open cavities are coated, the sealing article (the tray, together with the mass of foamable material), should not fill the cavity cross-section before foaming, so that the coatings may enter the cavity during immersion and drain from it after removal from the bath. As the automobile body is passed through an oven to cure the coating to the metal of the body, the foamable mass expands to fill the cavity cross-section and seal to the walls of the cavity. While this technique has proved generally satisfactory it suffers from two principal disadvantages First, because the foam material is not self-supporting during foaming, it is subject to sagging before the foam crosslinks, and therefore requires support. This problem is particularly severe when the axis of the cavity to be sealed is approximately horizontal, so that the foam material (which is perpendicular to the cavity axis) is approximately vertical, and the sagging therefore tends to limit expansion of the foam toward the upper parts of the cavity walls. The tray required to support the foam during expansion and sealing adds to both the weight and cost of the seal. Second, if the foamable material is supported from below during horizontal expansion, interfacial adhesion of the molten foaming material to the support restricts lateral expansion of the foam, so that greater expansion occurs perpendicular to the support (along the longitudinal axis of the cavity rather than towards the cavity walls). As a result, sealing may be incomplete, and a greater amount of foamable material is used in an attempt to ensure adequate sealing, also adding to both the weight and cost of the seal. This problem is particularly severe when the cavity to be sealed is highly irregular in cross-section or has a sharply acute angle, when a considerable excess of foamable material may be used to attempt to ensure that the foam fills the cavity cross-section and penetrates to the vertex of the angle.

It would be desirable to produce a cavity sealing article, especially a sealing article for use in a channel in a land, marine, or aerospace vehicle, such as a pillar in the body structure of an automobile or similar vehicle, that could be prepared readily and inexpensively, would be readily handleable and emplaceable within a cavity to be sealed without requiring special tooling, would be readily activatable by elevating the cavity temperature to such temperatures as are commonly encountered in operations on the vehicle body (e.g. 115° C. to 250° C. for automobile paint ovens), and, on activation, would provide an effective seal against infiltration of air, moisture, other undesirable fluids and particulates, and sound.

BRIEF SUMMARY OF THE INVENTION

In a first aspect, this invention provides a cavity sealing article comprising:
(a) an planar support member; and
(b) a sealing member comprising a foamable polymer surrounding and in intimate contact with the support member in the plane of the support member, the sealing member comprising at least two layers in intimate contact in the plane of the support member,
  the outermost of the layers comprising an uncrosslinked foamable polymer, and
  an inner layer comprising a crosslinked foamable polymer.

In a second aspect, this invention provides a method of sealing a cavity by use of the cavity sealing article of the invention.

DETAILED DESCRIPTION OF THE PREFERRED EMBODIMENTS

Figure 1:
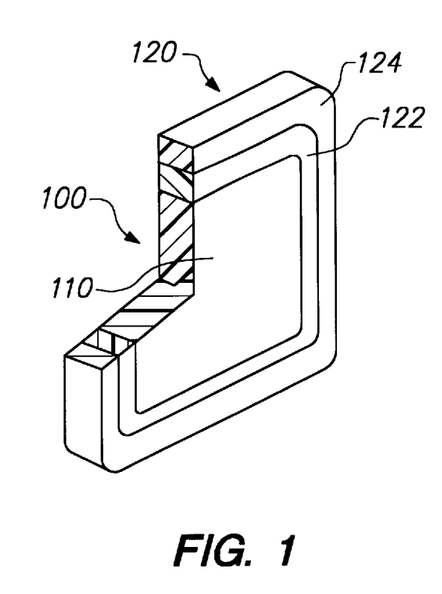
FIG. 1 is a partial cut away perspective view showing a first embodiment of the cavity sealing article of this invention.

Referring to the Figures, FIG. 1 is a partial cut away perspective view showing a first embodiment of the cavity sealing article of this invention. The article shown generally at 100 comprises a planar support member 110 and a sealing member shown generally at 120 surrounding the support member in the plane of the support member. In this first embodiment, the sealing member 120 comprises two layers, an inner layer 122 comprising a crosslinked foamable polymer and an outer layer 124 comprising an uncrosslinked foamable polymer. In this embodiment also, the support member is shown as being of the same thickness as the sealing member; and the cavity sealing article as a whole has a simple planar structure. The term "thickness" is used throughout this application when applied to the cavity sealing article of this invention to denote the dimension of the sealing member of the article that is perpendicular to the plane of the support member (so that the term "thickness" does not include the thickness of any channels or other portions of the support member that engage the sealing member from either or both sides, as seen in the fourth and fifth embodiments, for example).

Figure 2:
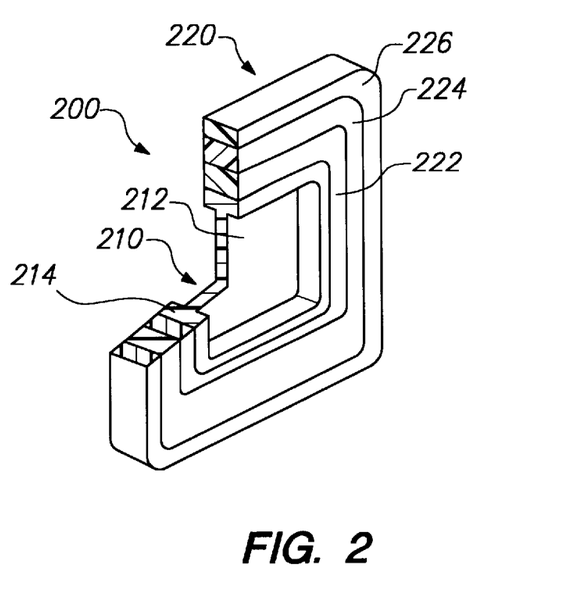
FIG. 2 is a partial cut away perspective view showing a second embodiment of the cavity sealing article of this invention.

FIG. 2 is a partial cut away perspective view showing a second embodiment of the cavity sealing article of this invention. The article shown generally at 200 comprises a planar support member shown generally at 210 and a sealing member shown generally at 220 surrounding the support member in the plane of the support member. In this embodiment, the support member 210 is thinner than the sealing member, so that it comprises a central planar region 212 and a T-shaped thickened periphery 214 of the same thickness as the sealing member; and the sealing member 220 comprises three layers, an inner layer 222 comprising an uncrosslinked polymer, which is not required to be foamable so that it may be either foamable or not foamable, a middle layer 224 comprising a crosslinked foamable polymer, and an outer layer 226 comprising an uncrosslinked foamable polymer. It is a particular advantage of the three-layer structure of the sealing member that the inner layer, which is uncrosslinked, will adhere and seal to the support member on foaming, thus providing additional sealing and structural strength to the sealing article after foaming. It may be seen that in this embodiment there is no need for the support member to be of the same thickness as the sealing member, and indeed it may be of any suitable thickness.

More typically, however, the support member and the sealing member of the cavity sealing article of this invention will engage in some manner to ensure that the sealing member will remain in the plane of the support member when the sealing member is foamed, and embodiments of the article showing such engagement are seen in FIGS. 3 through 7.

Figure 3:
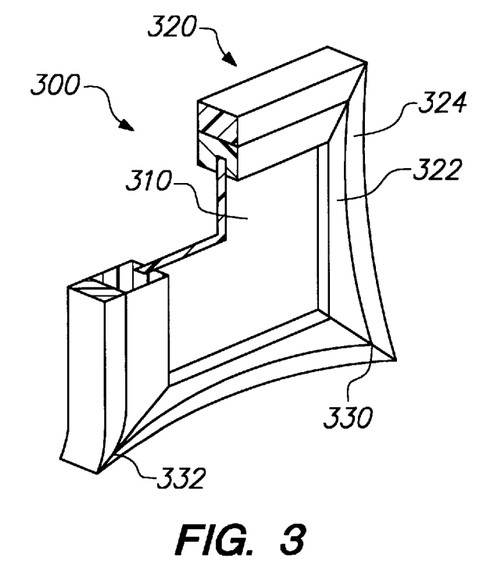
FIG. 3 is a partial cut away perspective view showing a third embodiment of the cavity sealing article of this invention.

FIG. 3 is a partial cut away perspective view showing a third embodiment of the cavity sealing article of this invention. The article shown generally at 300 comprises a planar support member 310 and a sealing member shown generally at 320 surrounding the support member in the plane of the support member. In this embodiment the support member 310 comprises a simple planar portion; and the sealing member 320 is thicker than the support member and is provided with a groove which engages the support member. As in the first embodiment, the sealing member 320 comprises only two layers, an inner layer 322 comprising a crosslinked foamable polymer, and an outer layer 324 comprising an uncrosslinked foamable polymer. In this embodiment, the sealing member is shown as being made in four pieces, one for each side of the support member.

Figure 4:
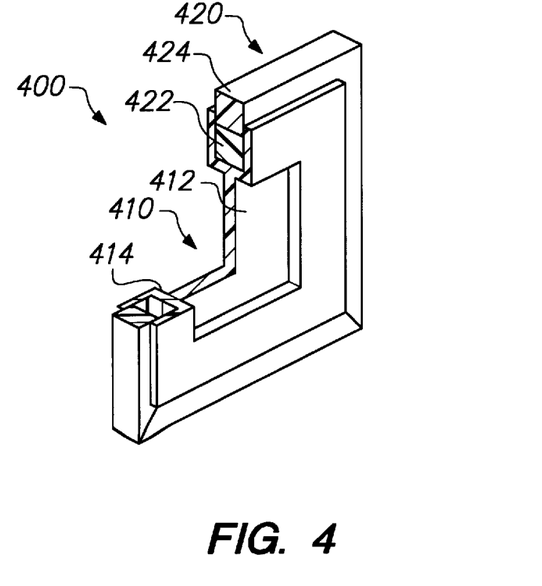
FIG. 4 is a partial cut away perspective view showing a fourth embodiment of the cavity sealing article of this invention.

FIG. 4 is a partial cut away perspective view showing a fourth embodiment of the cavity sealing article of this invention. The article shown generally at 400 comprises a planar support member shown generally at 410 and a sealing member shown generally at 420 surrounding the support member in the plane of the support member. In this embodiment, the support member 410 comprises a central planar region 412, the periphery of which is provided with a U-shaped channel 414 designed to engage the sealing member 420 and retain it in the plane of the support member 410 on foaming; and, as in the first embodiment, the sealing member 420 comprises two layers, an inner layer 422 comprising a crosslinked foamable polymer and an outer layer 424 comprising an uncrosslinked foamable polymer, in this embodiment also, the sealing member is shown as being made in four pieces, one for each side of the support member.

Figures 5, 6, 7, 8:
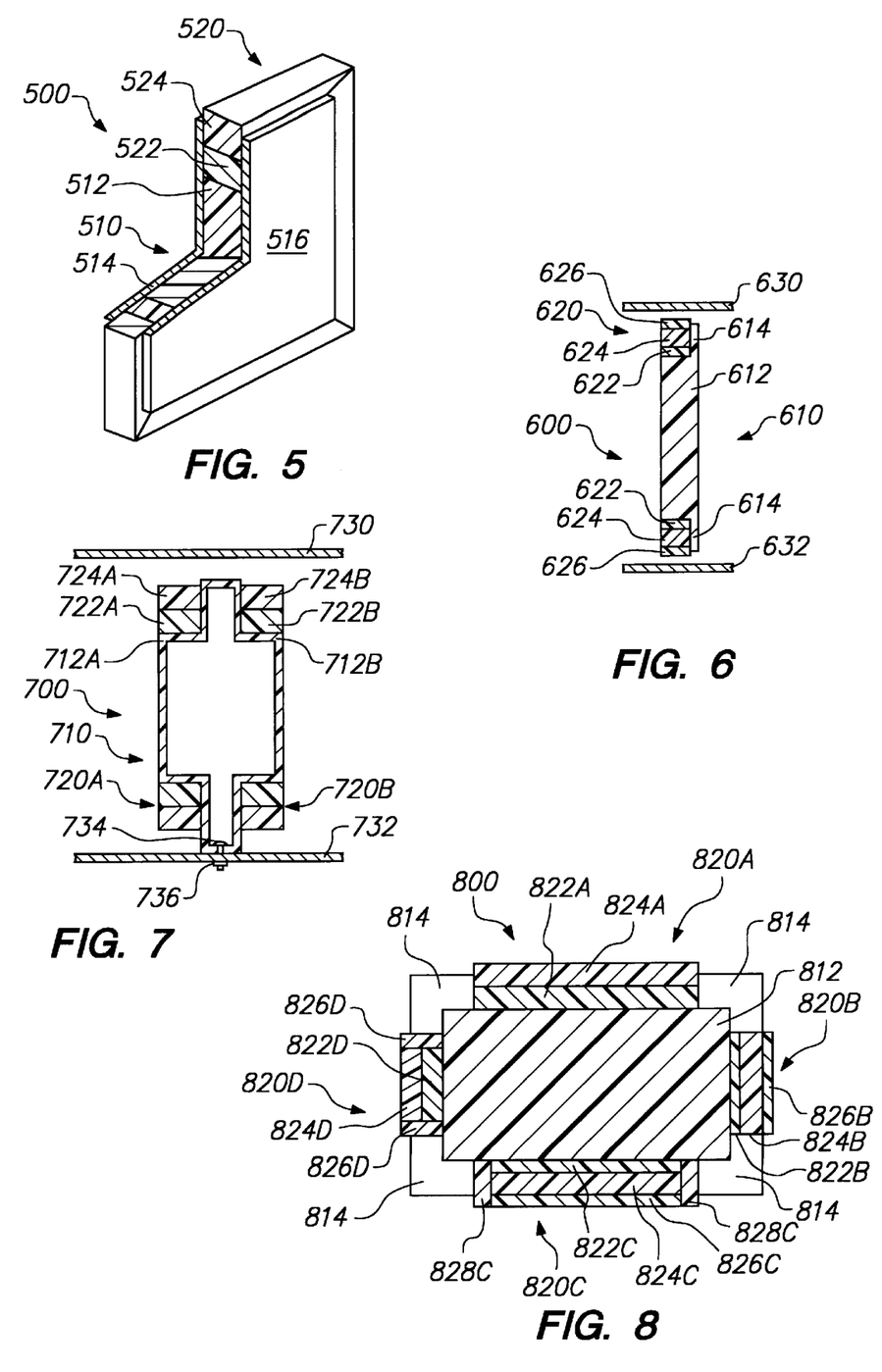
FIG. 5 is a partial cut away perspective view showing a fifth embodiment of the cavity sealing article of this invention.
FIG. 6 is a side cross-sectional view showing a sixth embodiment of the cavity sealing article of this invention.
FIG. 7 is a side cross-sectional view showing a seventh embodiment of the cavity sealing article of this invention.
FIG. 8 is a front cross-sectional view showing an eighth embodiment of the cavity sealing article of this invention where the sealing member is discontinuous.

FIG. 5 is a partial cut away perspective view showing a fifth embodiment of the cavity sealing article of this invention. The article shown generally at 500 comprises a planar support member shown generally at 510 and a sealing member shown generally at 520 surrounding the support member in the plane of the support member. In this embodiment, the support member 510 comprises a central spacer 512 that is enclosed between a pair of edge plates 514 and 516, the space between the edge plates outside the periphery of the spacer forming a U-shaped channel designed to engage the sealing member 520, as in the previous embodiment. As in the third and fourth embodiments, the sealing member 520 comprises two layers, an inner layer 522 comprising a crosslinked foamable polymer and an outer layer 524 comprising an uncrosslinked foamable polymer. In this embodiment also, the sealing member is shown as being made in four pieces, one for each side of the support member.

Although it is generally convenient that the sealing member be of a uniform width around the periphery of the support member (by which is meant the periphery of the central spacer in an embodiment such as the second embodiment shown above or the bottom of the channel in an embodiment such as the fourth or fifth embodiment shown above) for simplicity of manufacture, it is a feature of this invention that the sealing member may be of non-uniform width if so desired. The term "width" is used throughout this application to denote the dimension of the sealing member of the article of this invention, or of any layer of the sealing member, that is within the plane of the support member. In particular, it may be desirable that the crosslinked foamable polymer layer of the sealing member should be of non-uniform width to provide a greater or lesser width of the sealing member after foaming; and especially it may be desirable that the crosslinked foamable polymer layer of the sealing member have a region of greater width where the cross-section of the cavity to be sealed possesses a shape (such as a sharply re-entrant vertex) where it is impractical or undesirable for the shape of the support member to closely match the cross-section of the cavity at that location. Thus a greater width of the crosslinked foamable polymer layer may be desirable at a point on the periphery of the article where the cross-section of the cavity is formed by a "pinch weld", fold, or other joining technique that creates a sharply re-entrant vertex in the cross-section. FIG. 3 illustrates this greater thickness of the crosslinked foamable polymer layer 322 at corners 330 and 332, a feature that would be particularly appropriate if the cavity to be sealed had been formed by pinch welds between the cavity walls at positions corresponding to those corners. Also, as discussed in more detail later in this application, the width of the sealing member may be greater where the cavity shape is relatively regular and the walls relatively smooth in configuration (thereby enabling a greater spacing between the cavity sealing article and the cavity walls) and narrower when the cavity shape is relatively irregular (thereby enabling the shape of the article to follow the shape of the cavity more closely).

FIG. 6 is a side cross-sectional view of a sixth embodiment of the cavity sealing article of this invention shown within a cavity. The article shown generally at 600 comprises a planar support member shown generally at 610 and a sealing member shown generally at 620 surrounding the support member in the plane of the support member. In this embodiment, the support member 610 comprises a central planar region 612, the periphery of which is provided with a protrusion 614 designed to engage the sealing member 620 from one side and retain it in the plane of the support member 610 on foaming, and, as in the second embodiment, the sealing member 620 comprises three layers, an inner layer 622 comprising an uncrosslinked polymer, which is not required to be foamable, a middle layer 624 comprising a crosslinked foamable polymer, and an outer layer 626 comprising an uncrosslinked foamable polymer. The article is shown within a cavity having walls 630 and 632.

FIG. 7 is a side cross-sectional view of a seventh embodiment of the cavity sealing article of this invention shown within a cavity, where the article has the sealing member formed in two portions in spaced-apart relationship. The article shown generally at 700 comprises a planar support member shown generally at 710 and two portions of the sealing member shown generally at 720A and 720B surrounding the support member in the plane of the support member. In this embodiment, the support member 710 comprises two peripheral regions 712A and 712B, each providing support for a portion of the sealing member, and a protrusion 714 between the two peripheral regions designed to engage the portions 720A and 720B of the sealing member each from one side and retain them in the plane of the support member 710 on foaming. As in the first embodiment, the portions 720A and 720B of the sealing member each comprise two layers, inner layers 722A and 722B comprising a crosslinked foamable polymer, and outer layers 726A and 726B comprising an uncrosslinked foamable polymer. The article is shown within a cavity having walls 730 and 732, and the protrusion 714 is shown as being exaggerated on one side to enable fastening of the article within the cavity, such as by a bolt 734 and 736 through the protrusion and cavity wall 732.

FIG. 8 is a cross-section al view in the plane of an eighth embodiment of the cavity sealing article of this invention. The article shown generally at 800 comprises a support member shown generally at 810 surrounded by sealing member shown generally at 820. The support member 810, like that in the embodiments shown in FIG. 5 comprises a central plate 812 and a pair of edge plates, of which only one, shown as 814, is seen behind the plane of the cross-section. In this embodiment, it is shown that though the sealing member surrounds the support member in the plane of the support member, the sealing member need not be continuous prior to foaming. Four different configurations of the sealing member are shown. Sealing member 820A comprises two layers; inner layer 822A comprising a crosslinked foamable polymer and outer layer 824A comprising an uncrosslinked foamable polymer. Sealing member 820B comprises three layers; inner layer 822B comprising an uncrosslinked polymer; middle layer 824B comprising a crosslinked foamable polymer, and outer layer 826B comprising an uncrosslinked foamable polymer. Sealing member 820C also comprises three layers; inner layer 822C comprising an uncrosslinked polymer; middle layer 824C comprising a crosslinked foamable polymer, and outer layer 826C comprising an uncrosslinked foamable polymer, and also adds two pieces of uncrosslinked foamable polymer 828C at either end of the strip of sealing member to provide additional space filling and sealing capability on foaming. Sealing member 820D comprises only two layers; inner layer 822D comprising a crosslinked foamable polymer and outer layer 824D comprising an uncrosslinked foamable polymer, and also adds two pieces of uncrosslinked foamable polymer 826D at either end of the strip of sealing member to provide additional space filling and sealing capability on foaming. Any of these four different configurations of the sealing member may be used, alone or in conjunction with another configuration, to achieve the desired sealing effect.

Figure 9:
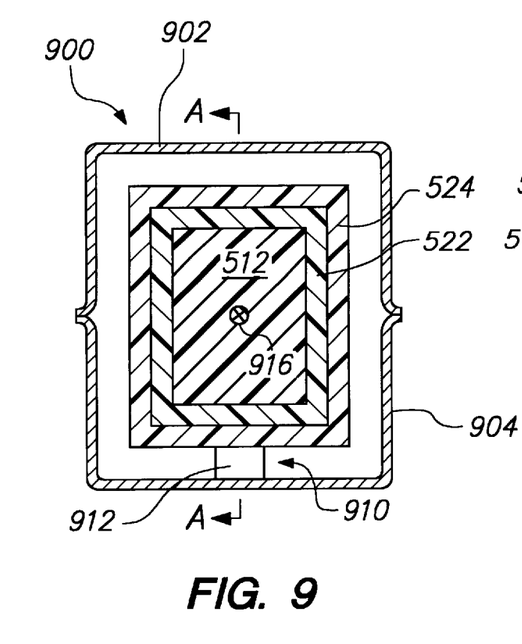
FIG. 9 is a front cross-sectional view showing an embodiment of the cavity sealing article of this invention, similar to the embodiment of FIG. 4, emplaced within a cavity to be sealed.
Figure 10:
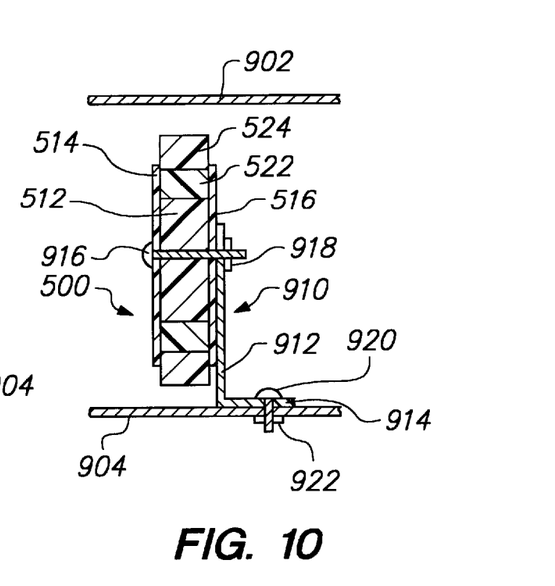
FIG. 10 is a side cross-sectional view along line A—A of FIG. 9, parallel to the longitudinal axis of the cavity.
Figure 11:
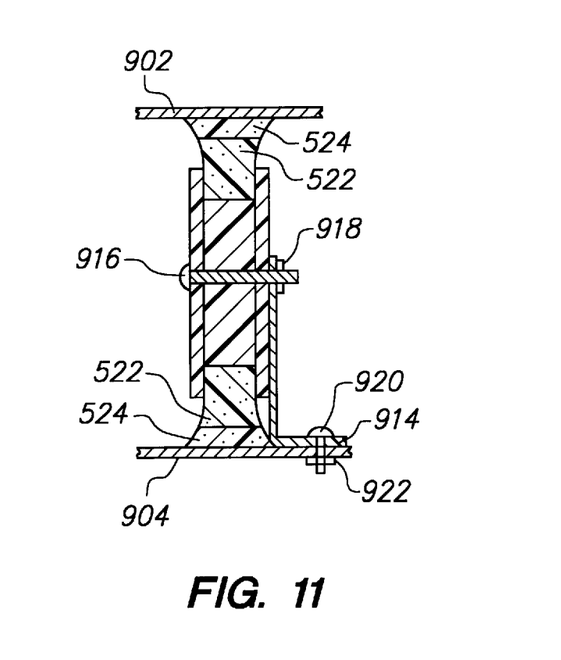
FIG. 11 is a side cross-sectional view showing the cavity sealing article of FIG. 9 after foaming.

FIG. 9 is a cross-sectional view in the plane of the cavity sealing article of FIG. 5 (i.e. where the support member comprises a central spacer and a pair of edge plates) emplaced within a cavity, the longitudinal axis of which is perpendicular to the page. The axis of the cavity may be oriented in any direction: horizontal, oblique, or vertical; so that the cross-section that is to be sealed may be, correspondingly, vertical, oblique, or horizontal. The cavity shown generally as 900 is defined by a pair of cavity wall forming members 902 and 904 which may be fastened together by any suitable means (not shown). The cavity sealing article 400 comprises the central spacer 512 and edge plates 514 and 516 (the edge plates not being seen as being out of the cross-section), and the sealing member shown generally at 520 comprises crosslinked foamable polymer inner layer 522 and uncrosslinked foamable polymer outer layer 524. The cavity sealing article 500 is positioned within the cavity 900 at the predetermined location by any suitable means, such as by a bracket 910, of which only a portion of one leg 912 may be seen; the article being secured to the leg 912 of the bracket by a bolt 916. FIG. 10 shows the cavity sealing article of FIG. 9 in a further cross-sectional view, where the longitudinal axis of the cavity is parallel to the page; and illustrates more clearly the way in which the article is positioned within the cavity by the bracket 910 As may be seen, the article is secured to leg 912 of the bracket 910 by bolt 916 and nut 918, while the other leg 914 of the bracket is secured to the cavity wall 904 by bolt 920 and nut 922. On activation of the article by the application of a sufficient temperature for a sufficient time, the crosslinked foamable polymer layer 522 of the sealing member 520 foams to expand and force the uncrosslinked foamable polymer layer 524, which also foams and expands, into contact with the cavity walls, thereby sealing the cavity. FIG. 11 shows the cavity sealing article of FIG. 9 after foaming, where the crosslinked foamable polymer layer 522 has foamed and expanded to more substantially fill the cavity cross-section; and the uncrosslinked foamable polymer layer 524, which has also foamed and expanded, has been forced into sealing contact with the cavity walls.

Structure and Composition of the Cavity Sealing Article

The Support Member

The support member may be prepared from any material having the structural integrity and durability necessary to permit storage of the cavity sealing article of this invention, placement of the article within a cavity to be sealed, sealing of the cavity by foaming of the sealing member, and use of the article within the cavity, potentially for an extended time such as the lifetime of a vehicle. This requires both structural stability at elevated temperatures (such as stability at temperatures of at least 150° C., preferably at temperatures of at least 180° C., and the ability to withstand the forces produced by foaming of the sealing member of the article at those temperatures) and long-term durability Typically, the support member will be prepared from a high melting point thermoplastic polymer, such as a high temperature polyolefin, a polyamide such as a nylon [for example, nylon 6, nylon 46, or nylon 66], a polyester [such as polyethylene terephthalate], an aromatic polyether, polyether ketone, or polyamide, a thermoset resin, or the like; especially one that may easily be formed into the desired shape. These polymers will typically contain fillers, antioxidants, flame retardants, and/or other stabilizers such as are conventional in polymeric articles, and may contain pigments, plasticizers, adhesion promoters, and the like. In addition, the polymers may contain reinforcing materials, such as glass fiber and the like, if needed or desired.

The support member may be formed as a single piece, such as by molding, or assembled from two or more pieces, as discussed previously.

Structurally, the support member may be as simple as a sheet of the appropriate material formed to the desired shape, but, especially if the support member is relatively thin, one or both sides of the sheet may be reinforced by ribs or other stiffening means molded into the support member. The support member may be made of a foamed material, if desired, and this is especially attractive if the support member comprises a single piece of the appropriate material, as in the first embodiment shown above, for example, or if the support member comprises a central spacer and edge plates, as in the fifth embodiment shown above, where the use of foamed material for the central spacer may be advantageous for weight and cost.

If the thickness of the support member is not as great as the thickness of the sealing member, the periphery of the support member may be left shallower than the sealing member and the sealing member grooved to accommodate the support member (for example, as shown in FIG. 3), or may be thickened to the same or greater thickness than the sealing member (for example, as shown in FIGS. 2 and 4), to enable mounting of the sealing member on the support member The Sealing Member Suitable compositions for the foamable layers of the sealing member of the cavity sealing article of this invention will be foamable polymer compositions having a foaming temperature appropriate to the temperature range of intended application, for example a foaming temperature within the range of temperatures to be encountered in bake ovens for vehicle bodies, and the like. Such compositions will contain a base polymer and a blowing agent to cause foaming of the polymer. They will typically also contain fillers, antioxidants, flame retardants, and/or other stabilizers such as are conventional in polymeric articles, and may contain pigments, plasticizers, adhesion promoters, activators for the blowing agents, and the like. Suitable compositions for the non-foamable layers of the sealing member, if such layers are present, will typically contain the same base polymer, fillers, etc., but will lack the blowing agent.

The uncrosslinked polymer layer of the sealing member (sometimes referred to elsewhere in this application simply as "the sealer") may, and preferably will, contain a chemical crosslinking agent to strengthen the resulting foamed polymer and may also contain a tackifier to maximize adhesion of the article to the cavity walls and to the support member, if an uncrosslinked foamable polymer layer constitutes the innermost layers of the sealing member, on foaming. If the sealer and the crosslinked layer of the sealing member (sometimes referred to elsewhere in this application simply as the "driver") are made of two different compositions and are assembled before crosslinking of the driver (for example by comolding or coextrusion of the driver and sealer portions of the sealing member), and the driver is to be crosslinked by radiation, then the sealer may contain an agent chosen to prevent radiation crosslinking (an "anti-rad", for example a free-radical quencher such as an amine) so that the whole sealing member may be irradiated with only the driver being crosslinked by the radiation. The sealer is uncrosslinked before foaming, by which is meant that it is either totally free of crosslinking or has such a low degree of crosslinking that it substantially retains the foaming and adhesive characteristics of an uncrosslinked polymer. Desirably, the sealer becomes crosslinked on foaming, as discussed in more detail later in the application, as this provides additional stability to the foam, but it is within the scope of the invention that the sealer may be uncrosslinked (as defined immediately above) even after foaming.

The crosslinked polymer driver layer of the sealing member will typically contain either or both of a chemical crosslinking agent and a radiation crosslinking promoter (a "pro-rad") to enhance radiation crosslinking of the driver. Where the driver layer of the sealing member is chemically crosslinked, the crosslinking agent chosen will be one having an activation temperature substantially below the activation temperature of the blowing agent so that the driver may be crosslinked before any foaming occurs. When the driver layer of the sealing member is radiation crosslinked, such as by exposure to electron beam irradiation the driver layer will typically contain a radiation crosslinking promoter: the amount and type of which may be chosen depending on the polymer composition. When the driver is crosslinked by radiation, the extent of the irradiation will depend on the material of the driver (the polymer, additives, etc.), the type and quantity of radiation crosslinking promoter, the thickness of the article, etc. Typical irradiation dosages for electron beam irradiation will lie between 0.25 and 20 Mrad, preferably between 0.5 and 10 Mrad.

Suitable non-foamable uncrosslinked layers, if present (such as possibly the inner layers 222 in FIG. 2, 622 in FIG. 6, etc.), will desirably be prepared of the same materials as the foamable layers, lacking only the blowing agent and any associated activators.

Although it is not required by this invention that the compositions of the various layers of the sealing member of the article be the same, they should be compatible so that they seal to each other and the resulting article provides an optimal seal when the article is used.

It may be convenient for manufacture that the compositions of the polymers of the driver and sealer of the sealing member should be the same, and it may be further convenient that the sealing member should be formed from a single piece of such a foamable polymeric composition. In this case, the driver layer of the sealing member will typically be crosslinked by radiation, and the foamable polymeric composition will contain both the chemical crosslinking agent for the sealer and desirably will also contain a radiation crosslinking promoter to enhance radiation crosslinking of the driver. More typically, however, the sealing member will be formed from two or more layers prepared independently and then assembled, as discussed further later in this application. This use of independently prepared layers of the sealing member permits optimization of the various layers of the sealing member for the function that each layer performs in use.

Suitable base polymers may include a wide range of polymers, typically chosen for a particular application so that the resulting sealing member will foam at a convenient temperature for sealing of the cavity to be sealed and will be stable under intended use conditions. A suitable base polymer or mixture of polymers will thus have a softening point below the desired temperature of foaming in the absence of crosslinking, for example at a temperature at least 50° C. below the desired foaming temperature. The melt index (as measured by ASTM D-1238) of the polymer or mixture of polymers will desirably be from 0.5 to 10, preferably from 3 to 7, and in any event will desirably be chosen to give an appropriate degree of expansion of the resulting sealing member during foaming.

Suitable polymers thus include olefinic polymers such as very low density polyethylene, low density polyethylene, medium density polyethylene high density polyethylene, polyethylenes or ethylene copolymers prepared by metallocene polymerization (such as Exact [Exxon] and Engage [Dow]), ethylene copolymers such as ethylene-vinyl acetate copolymer ethylene-methacrylic acid copolymer, ethylene-acrylic acid copolymer, ethylene-butyl acrylate copolymer, ionomers (such as Surlyn [duPont] and Iotek [Exxon]), ethylene terpolymers such as ethylene-vinyl acetate-methacrylic acid copolymer, elastomers such as ethylene-propylene rubber, EPDM, nitrile rubbers, butyl rubbers, chloroprene, chloropolyethylene, polyacrylate elastomers, chlorosulfonated polyethylene, thermoplastic elastomers, and fluoropolymers such as polyvinylidene fluoride, ethylene-tetrafluoroethylene copolymer, fluorinated ethylene-propylene copolymer, poly (chlorotrifluoroethylene), ethylene-chlorotrifluoroethylene copolymer, etc., and mixtures of any two or more of the above.

For example, a suitable polymer or mixture of polymers for use in a cavity sealing article for use in the automobile industry, where bake oven temperatures will be in the range of 115° C. to 250° C., say around 160° C., may have a softening point below about 100° C. preferably below 90° C., in the absence of crosslinking. Such polymers may include ethylene-vinyl acetate copolymer (EVA), ethylene-methyl acrylate copolymer (EMA), and the like, optionally admixed with each other or with such polymers as low density polyethylene and/or ionomers. An exemplary polymer is EVA having a vinyl acetate (VA) content between 5% and 45%, especially between 15 and 35%, particularly between 20% and 30%.

Suitable fillers for the composition of the sealing member include inorganic fillers such as zinc oxide, barium sulfate (Huberbrite), calcium carbonate, magnesium hydroxide, alumina trihydrate, and the like; at a concentration up to about 40 parts per 100 parts of the base polymer.

The blowing agent is chosen so as to effect foaming and expansion of the sealing member of the article at an elevated temperature normally present during the manufacture of the product containing the cavity to be sealed; for example, at a temperature normally present during passage of an automobile body through a paint bake oven (typically 115° C. to 250° C). Suitable blowing agents will include from to 1 to 15 parts per 100 parts of base polymer of an azodicarbonamide or benzenesulfonyl hydrazide. Suitable azodicarbonamide blowing agents include Celogen® AZ 130 or 3990; and suitable modified azodicarbonamide agents include Celogen® 754 or 765, all from Uniroyal Chemical. Suitable benzenesulfonyl hydrazide blowing agents include p,p'-oxybis(benzenesulfonyl hydrazide), sold as Celogen® OT, and p-toluenesulfonyl hydrazide, sold as Celogen® TSH, both also from Uniroyal. The blowing agent may also be made up of a combination of agents depending on the degree of expansion desired for a particular application; and may also include a blowing agent activator such as diethylene glycol, urea, dinitrosopentamethylenetetramine (DNPT), and the like. Certain fillers, such as zinc oxide (Kadox), may also act as activators for the blowing agent. The amount of activator added will depend on the choice of blowing agent and the amount of expansion required.

Flame retardants may also be present, of such kinds and at such concentrations as will provide flame retardancy for the article. These may include halogenated flame retardants such as the polybrominated aromatics (e.g. decabromobiphenyl), and the like, for example in combination with inorganic materials such as antimony trioxide; or may include non-halogenated flame retardants, such as the magnesium hydroxide and alumina trihydrate previously mentioned as fillers.

The chemical crosslinking agent is preferably a free radical crosslinking agent compatible with the base polymer of the article. Preferred chemical crosslinking agents are peroxides, such as bis(t-butylperoxy)diisopropylbenzene, 1,1-di-t-butylperoxy-3,3,5-trimethylcyclohexane, 4,4-di-t-butylperoxy n-butyl valerate (Trigonox), dicumyl peroxide (Dicup), and the like. In most cases, the chemical crosslinking agent is provided at 1 to 5 parts per 100 parts of base polymer.

The blowing agent and the chemical crosslinking agent will be chosen so that the chemical crosslinking agent has an activation temperature approximately that of the blowing agent. For example, it may have an activation temperature slightly below that of the blowing agent, so that the foam maintains stability during expansion; but desirably the kinetics of the crosslinking and foaming reactions are such that the sealer of the sealing member expands and foams on heating, and adheres to the walls of the cavity, before the resulting foam is completely crosslinked by action of the chemical crosslinking agent. Desirably, the activation temperature of the blowing agent will be chosen so that the blowing agent is not easily accidentally activated (such as by mixing at a temperature above the optimal mixing temperature, during welding or other forming of a cavity in which the article is emplaced, or during phosphating, painting or other coating treatments, or drying of such coatings) but is only activated when it encounters temperatures in which it is desired that the sealing member of the article should foam, such as are present in bake ovens.

The radiation crosslinking promoter may be chosen from among those conventionally used to promote the crosslinking of polymers, such as triallyl cyanurate (TAC), triallyl isocyanurate (TAIC), triallyl trimellitate, triallyl trimesate, tetraallyl pyromellitate, the diallyl ester of 1,1,3-trimethyl-5-carboxy-3-(4-carboxyphenyl)indane, trimethylolpropane trimellitate (TMPTM, Sartomer 350), pentaerythritol trimethacrylate, tri(2-acryloxyethyl) isocyanurate, tri(2-methacryl-oxyethyl) trimellitate, and the like, and combinations thereof The tackifier, if present, will be chosen to enhance the tackiness of the uncrosslinked layers of the article (for example, the outermost layer, and optionally any inner uncrosslinked layers such as layer 222 in FIG. 2) on expansion but not such that the surfaces exhibits tackiness after formation of the article and before expansion, since it is generally desirable that the article should be dry and non-tacky during initial placement of the article in the cavity. Desirably, to enhance the adhesive qualities of the base polymer at the temperature of expansion, the tackifier will have a relatively low molecular weight, no significant crystallinity, a ring-and-ball softening point above at least 50° C. (and preferably higher, near the softening point of the base polymer), and will be compatible with the base polymer and other polymers present, The tackifier may be present in up to 30 parts per 100 parts of base polymer. Suitable tackifiers include novolak resins, partially polymerized rosins, tall oil rosin esters, low molecular weight aromatic thermoplastic resins, Picco® and Piccotac® resins from Hercules Chemical, and the like.

Antioxidants, adhesion promoters, plasticizers, pigments, and the like may also be employed in conventional amounts.

Exemplary formulations include:

| Ingredient | Formulation, parts by weight | | | |
|---|---|---|---|---|
| | A | B | C | D |
| Evatane 28-05 (EVA) | | 100 | | 100 |
| Elvax 470 (EVA) | 100 | | 100 | |
| Irganox 1076 (antioxidant) | 2 | 2 | 2 | 2 |
| Kadox 911 (ZnO) | 30 | 30 | | |
| Huberbrite 7 (BaSO$_4$) | | | 30 | 30 |
| Piccotac 95 (tackifier) | | | | 30 |
| Varox 231 XL (chemical crosslinking agent) | 2.5 | 1.5 | 2.5 | 1.5 |
| Celogen TSH (blowing agent) | | 10 | | 10 |
| Celogen OT (blowing agent) | 10 | | 10 | |
| Sartomer 350 (radiation crosslinking promoter) | 5 | 5 | 5 | 5 |

Of these formulations, formulations A and C are particularly applicable to the manufacture of the sealer layer of a sealing member of the article of this invention, while formulations B and D are applicable to the manufacture of both the driver and sealer layers of a sealing member of the article. Of course, if a formulation is to be used only for the manufacture of the uncrosslinked layers, no radiation crosslinking promoter will be required; and if a formulation is to be used only for the manufacture of a non-foamable uncrosslinked layer, neither a blowing agent nor a radiation crosslinking promoter will be required.

The compositions may be prepared by methods conventional in the art of polymer blending, such as by mixing in a high shear mixer such as a Banbury or Brabender type mixer, with care being taken to ensure that the temperature of the blend does not rise to such an extent that the chemical crosslinking agent or blowing agent are activated. Typically, the base polymer, other polymers/tackifier (if present), and antioxidant are added first, and blended to homogeneity. The filler, adhesion promoter, pigments (if present) may be mixed with the base polymer, or may be added after the base polymer has been softened by mixing. These first mixing stages are not particularly temperature-sensitive. Once all ingredients other than the blowing and crosslinking agents have been added and fully blended, however, temperature control becomes important as these last agents are added. Accordingly, the mixer is cooled so that the temperature of the composition does not exceed about 95° C., and more preferably does not exceed about 80° C.; the blowing agent(s), accelerator(s), crosslinking agents, and any plasticizers are added, and the resulting composition is subjected to high shear mixing under controlled temperature conditions until the composition is homogeneous. The composition may then be cooled, for example by processing through a two-roll mill with cooled rollers.

The resulting bulk composition may then be formed into the appropriate shape for sealing member of the cavity sealing article of this invention by any appropriate means. A particularly convenient method for manufacture of the sealing member is that each of the layers that make up the sealing member are independently formulated and be extruded or rolled into sheets of the appropriate width, the sheets are laminated together, and the resulting laminate is cut into strips of the appropriate thickness (the terms "width" and "thickness" being used here with regard to the finished article, as described previously) for use in the cavity sealing article. The strips of the sealing layer may then be assembled with the support member to form the sealing article.

The particular compositions used to make the various layers of the sealing member of the cavity sealing article of this invention are not critical; and a person of ordinary skill in the art should have no difficulty, having regard to that skill and this disclosure, including the references cited here, in determining suitable formulations to prepare a sealing member for the article of this invention or in optimizing such compositions for a particular application.

Manufacture of the Cavity Sealing article

Typically a cavity sealing article according to this invention is formulated and shaped specifically for use in a particular cavity which is intended to be sealed. This is especially true in automobile or other vehicle manufacture, where cavities may be of very different cross-sections, and the quality of the seal is of considerable importance to provide a moisture, sound, and particulate barrier.

The thickness of the cavity sealing article of this invention will typically be between 3 mm and 13 mm, more typically between 5 mm and 8 mm.

The cavity sealing article of this invention, as previously described, comprises a support member surrounded by a sealing member, the shape and size of each of which will be chosen based on the cavity cross-section and the foaming properties of the sealing member. The cross-section of the article will desirably be chosen so that before foaming of the sealing layer the article will substantially but not completely fill the cavity cross-section. Typically, the article will have linear dimensions in the plane of the support member that are between 2 mm and 16 mm less than the linear dimensions of the cross-section of the cavity at the location to be sealed (i.e. the clearance gap between the article and the cavity walls will be between 1 mm and 8 mm); preferably, the article will have linear dimensions in the plane of the support member that are between 6 mm and 10 mm less than the linear dimensions of the cross-section of the cavity at the location to be sealed (i.e. the clearance gap between the article and the cavity walls will be between 3 mm and 5 mm).

The size of the support member and the width of the sealing member will be determined by the extent of expansion of the various layers of the sealing member on foaming, and the desired interference between the cavity walls and the foamed sealing member (i.e. the extent to which the article after foaming would be larger than the cavity dimensions if the article were foamed without the restraint imposed by the cavity walls). For convenience, desirably the sealing member will have a width between 4 mm and 20 mm, more desirably, between 8 mm and 16 mm, resulting in individual layers of the sealing member having a width between 2 and 10 mm, more desirably between 3 and 8 mm. Typically, the support member will have linear dimensions in the plane of the support member that are between 8 mm and 40 mm less than the linear dimensions of the cross-section of the cavity at the location to be sealed (i.e. the "fill gap" between the support member and the cavity walls will be between 4 mm and 20 mm); preferably, the support member will have linear dimensions in the plane of the support member that are between 16 mm and 30 mm less than the linear dimensions of the cross-section of the cavity at the location to be sealed (i.e. the "fill gap" between the support member and the cavity walls will be between 8 mm and 15 mm).

The width of the sealing member, and of its various layers, may be varied between different portions of the sealing article, depending particularly on the complexity of the shape of the cavity to be sealed. For example, if the cavity is of relatively regular shape and the cavity walls are relatively smooth (lacking in sudden changes in direction) then a relatively greater clearance gap between the article and the cavity walls may be desirable; such as to permit the ready flow of paint when the cavity to be sealed is an automobile pillar painted by total immersion In such a case, the fill gap will also generally be greater and, correspondingly, the sealing member will be of greater width. However, if the cavity is of relatively irregular shape, then a narrower clearance gap between the article and the cavity walls may be desirable; and in such a case, the fill gap will also be smaller and the sealing member be of lesser width. Thus a cavity of complex shape may be filled by a cavity sealing article of this invention with different clearance gaps, fill gaps, and sealing member thicknesses at different locations in the article.

Typically, when the sealing member is of a uniform width, the width of the sealing member will be divided between the various layers in such a way that the width of the crosslinked foamable layer is between 25% and 75%, especially about 50%, of the width of the sealing layer as a whole; and if the sealing member comprises three layers, the width of the inner uncrosslinked layer will typically be no greater than the width of the outer uncrosslinked foamable layer.

Especially if the cavity is of irregular shape, the configuration of the sealing member may be exaggerated in the direction of shape irregularities, especially vertices, in the cross-section of the cavity, to ensure that the uncrosslinked sealer layer is driven completely into these irregularities and vertices and the resulting foam completely fills and seals the cavity, as discussed previously. The sealer layer of the article will relatively uniformly surround the driver layer in the plane of the support member and be of such a size that it provides sufficient sealing (i.e. as yet uncrosslinked) foam during expansion to completely fill all spaces between the article and the cavity walls and, desirably, adhere to them. The optimal size of the sealer layer will therefore depend on such factors as the volume expansion of the material of the sealer layer, its extent of expansion, the extent to which the expanded driver layer will fill the cavity, and the like; and it will be evident to a person of ordinary skill in the art, having regard to this disclosure, that a substantial variation in these materials and dimensions is possible in the design of a cavity sealing article of this invention.

The various layers of the sealing member will be chosen so that the cavity is sealed by the article when the sealing member is foamed. Desirably, to help ensure sealing, the widths of the layers, and their expansion rations, will be chosen such that the sealing layer, if formed in an unconstrained manner, would more than completely fill the cavity at the predetermined location, so that there is an "interference" between the foamed sealing member and the cavity walls; so that the sealing member in actual use will experience an expansion constrained by the cavity walls. The primary "filling" effect of the sealing member will typically be provided by the crosslinked foamable polymer layer.

A person of ordinary skill in the art will have no difficulty, having regard to that skill and this disclosure, in determining suitable dimensions and materials for the support member and sealing member of the article of this invention or in optimizing a given design for a particular application.

Use of the Cavity Sealing Article

The cavity sealing article of this invention is used by placement in the cavity to be sealed, preferably centrally in the cavity cross-section and with the cross-section of the article approximately aligned with the cross-section of the cavity. The article may be emplaced in the cavity by such means as are conventional in the art, for example by emplacement through a hole into an already formed cavity or, more usually, by fastening onto one of two or more wall members which are subsequently fastened together to form the cavity. It is a feature of the cavity sealing article of this invention that, because of the use of the support member and sealing member of the article to maximize its cavity filling and sealing efficacy, exact placement of the article in the cavity is not as position-critical as placement of prior art cavity seals, though it will be apparent that sealing of a cavity with the article of this invention is maximized when the article is appropriately placed in the cavity, The article may be emplaced by mounting on a bracket or other support (such as is illustrated in FIGS. 6, 7, and 8). In some instances, the cavity to be sealed will have a structural part or parts which will support the cavity sealing article in a desired location, particularly if the support member has been molded or shaped to a predetermined shape for that location and/or is provided with molded-in features (for example, holes or protrusions) to engage those parts. In other instances, the article may be formed with features, such as protrusions extending from the support member of the article such that the protrusions engage the cavity to provide correct placement of the article in the predetermined location. The support member of the article may also be provided with clips or the like to engage holes in the cavity walls; or may be provided with holes to engage protrusions clips, or the like, formed in or attached to the cavity walls. More typically, the article may be emplaced by fastening to a bracket which is in turn fastened to or otherwise firmly located in the cavity, such as is well-known in the art for other foamable cavity seals. This is shown in FIGS. 6, 7, and 8, as discussed previously. It will be evident to one of ordinary skill in the art, having regard to that skill and this disclosure that other means may be used to emplace the sealing article of this invention within a cavity to be sealed, and that all such means fall within the scope of this invention.

Because the support member of the article of this invention is chosen to be dimensionally stable even at temperatures at which the sealing member is activated and foamed, the article can therefore be emplaced within the cavity to be sealed by a simple support, rather than requiring substantial support to prevent its sagging during heating and foaming (especially when the cross-section to be sealed is vertical and sagging of the article would tend to cause the sealing material to pull away from the cavity wall above the sealing article). As a result, the cavity sealing article of this invention does not need expensive or complex mounting within the cavity to be sealed, but yet will still provide an excellent seal when used.

When the article is emplaced within a cavity of a vehicle, the article is desirably placed such that there is substantially complete clearance around it within the cavity before activation and foaming, thereby permitting the phosphating, rustproofing, electrochemical painting, and other treatments such as are commonly given to vehicle bodies. When the article is emplaced within a cavity that is not subject to painting and the like, such clearance is not necessary.

When it is desired to foam the sealing member of the article of this invention, the article is exposed to a sufficient temperature for a sufficient time to activate the blowing agent and the chemical crosslinking agent. Suitable times and temperatures will depend on the application in which the seal is to be used, and may include temperatures between 100° C. and 300° C. or greater for periods between 5 and 100 minutes. Typically, in the case of sealing channels in new vehicle bodies, this heat activation will occur when the body is placed in a paint bake oven to cure previously applied paint, and such temperatures and times are typically between 115° C. and 250° C. for 10 to 40 minutes, for example 160° C. for 25 minutes, but a person of ordinary skill in the art will realize that other temperatures and times may be appropriate. Also, the sealing member may be foamed by other heat sources (for example, local heating such as induction heating of the area), for example if it is being used for repair purposes or is being emplaced in a large structure. On heating, the uncrosslinked sealer portion of the sealing member of the article softens and foams while the crosslinked driver portion of the sealing member foams in a uniform fashion to push the sealer into intimate sealing contact with the walls of the cavity. The foam of the sealer portion is then chemically crosslinked, stabilizing the sealer foam so that the insert forms a stable plug filling the whole cross-section of the cavity and intimately bonded to the cavity walls, acting as a moisture, sound, and particulate barrier.

The invention is illustrated by the following Example.

EXAMPLE 1

A test cavity of approximately trapezoidal shape was prepared from mild steel. The base of the trapezoid was 76 mm, the top was 70 mm, and the height was 67 mm. The two top corners of the trapezoid were rounded, and the two base corners were pinch welded, forming sharp vertices.

A cavity sealing article according to this invention was prepared as follows: Support member: The support member was prepared in the manner shown in FIG. 5, that is, with a central spacer having edge plates on either side to form a channel around the periphery of the support member. The central spacer was a trapezoid of base 44 mm, top 38 mm, and height 35 mm, made from 6.5 mm thick nylon 66. Each edge plate was a trapezoid of base 57 mm, top 51 mm, and height 48 mm, made from 3.2 mm thick nylon 66. The spacer and the edge plates were assembled with four 3 mm bolts, so that the resulting support member constituted a trapezoid of base 44 mm, top 38 mm, and height 35 mm, with a channel 6.5 mm thick and 6.5 mm deep surrounding its periphery.

Sealing member: The sealing member was also prepared as in FIG. 5. A foamable sheet was prepared from the following formulation:

| Ingredient | Parts by weight |
| --- | --- |
| Elvax 470 (EVA, duPont) | 80 |
| Evatane 28-05 (EVA, 28% VA, MFI 5, Atochem) | 20 |
| Irganox 1076 (antioxidant, Ciba-Geigy) | 2 |
| Kadox 911 (zinc oxide) | 10 |
| OMYA-Car-UFT (calcium carbonate) | 30 |
| Raven C Ultra Beads (carbon black) | 2 |
| Piccotac 95 (tackifier, Hercules) | 15 |
| Varox DCP40KE (peroxide crosslinker, Vanderbilt) | 4 |
| Celogen OT (blowing agent, Uniroyal) | 5 |
| Sartomer 350 (radiation crosslinking promoter, Sartomer) | 5 |

A Brabender mixer was set at 80° C.; and all materials except the Varox, Celogen, and Sartomer were added and blended to homogeneity. The Varox, Celogen, and Sartomer were then added and blended to homogeneity, ensuring that the temperature of the mixer remained below 80° C. during the mixing process. The mixed material was then pelletized to give pellets of a base uncrosslinked foamable polymer. Sheets 5, cm×5 cm×6.5 mm were molded from these pellets at about 100° C. (below the decomposition temperature of the Varox and Celogen). One sheet was irradiated with 4.8 Mrad of 3.5 MeV electrons to form a crosslinked foamable polymer "driver"; while a second foamable polymeric sheet was left uncrosslinked to form the "sealer". Each of these sheets had an unconstrained linear expansion of approximately 150%. The two sheets were laminated under pressure at 100° C., and the resulting laminated sheet cut into strips 6.5 mm wide (the width of the strips thus becoming the thickness of the resulting sealing member).

Assembly: From the strips of laminated sheet, four pieces were cut to fit the four sides of the support member, with the crosslinked polymer layer forming the inner layer of the sealing member (the layer adjacent to the spacer) and the uncrosslinked polymer layer forming the outer layer of the sealing member. The ends of the pieces were beveled, so that the four pieces formed a hollow trapezoid around the spacer of the support member. The finished sealing article thus formed a trapezoid of base 70 mm, top 64 mm, and height 61 mm, with the sealing member having a thickness of 6.5 mm.

The sealing article was emplaced in the cavity by means of an L-shaped bracket with one leg bolted through the center of the support member and the other leg bolted to the cavity wall, centered in the cross-section of the cavity so that there was approximately 3 mm clearance between the sealing article and the cavity walls all around the periphery of the sealing article; the clearance being such that the expansion of the sealing layer would be constrained by the cavity walls.

The test cavity containing the sealing article was placed in a 180° C. oven for 30 minutes, then removed and allowed to cool.

Examination of the test cavity revealed that the inner crosslinked foamable polymer (driver) layer of the sealing member of the article had foamed and expanded beyond the channel in the support member, forming a uniform foam with small closed cells. This foam had forced the outer uncrosslinked foamable polymer (sealer) layer of the sealing member into close proximity with the walls of the test cavity. The sealer layer of the article had also foamed, although in a less uniform fashion and with open cells visible on the surface, but, with the driver layer and the support member, had completely filled the test cavity cross-section and displayed excellent adhesion to the cavity walls.

The resulting foamed article was non-tacky and non-moisture absorbing, and effectively sealed the cavity.

While this invention has been described in conjunction with specific embodiments and examples, it will be evident to one of ordinary skill in the art, having regard to this disclosure, that equivalents of the specifically disclosed materials and techniques will also be applicable to this invention; and such equivalents are intended to be included within the following claims.

What is claimed is:

1. A cavity sealing article comprising:
   (a) a planar support member; and
   (b) a sealing member comprising a foamable polymer surrounding and in intimate contact with the support member in the plane of the support member, the sealing member comprising at least two layers in intimate contact in the plane of the support member,
      the outermost of the layers comprising an uncrosslinked foamable polymer, and
      an inner layer comprising a crosslinked foamable polymer.

2. The article of claim 1 where the sealing member comprises an inner layer and an outer layer in the plane of the support member,
   the inner layer comprising a crosslinked foamable polymer surrounding and in intimate contact with the support member in the plane of the support member, and
   the outer layer comprising an uncrosslinked foamable polymer surrounding and in intimate contact with the inner layer in the plane of the support member.

3. A cavity sealing article comprising:
   (a) a planar support member; and
   (b) a sealing member comprising a foamable polymer surrounding and in intimate contact with the support member in the plane of the support member, the sealing member comprising an inner layer, a middle layer, and an outer layer, in the plane of the support member,
      the inner layer comprising an uncrosslinked polymer surrounding and in intimate contact with the support member in the plane of the support member,
      the middle layer comprising a crosslinked foamable polymer surrounding and in intimate contact with the inner layer in the plane of the support member, and
      the outer layer comprising an uncrosslinked foamable polymer surrounding and in intimate contact with the middle layer in the plane of the support member.

4. A cavity sealing article for use in a longitudinally extending cavity defined by cavity walls, the cavity having a cross-section within the cavity walls which is to be sealed at a predetermined location, the article comprising
   (a) a planar support member; and
   (b) a sealing member comprising a foamable polymer surrounding and in intimate contact with the support member in the plane of the support member, the sealing member comprising at least two layers in intimate contact in the plane of the support member,
      the outermost of the layers comprising an uncrosslinked foamable polymer, and
      an inner layer comprising a crosslinked foamable polymer, the article having a size and shape such that the article incompletely occupies the cross-section of the cavity at the predetermined location and the sealing member of the article having expansion and sealing properties such that, when the article is placed at the predetermined location within the cavity and the sealing member is foamed, the foamed outermost layer is forced into intimate and sealing contact with the cavity walls.

5. The article of claim 4 where the sealing member comprises an inner layer and an outer layer in the plane of the support member,
   the inner layer comprising a crosslinked foamable polymer surrounding and in intimate contact with the support member in the plane of the support member, and
   the outer layer comprising an uncrosslinked foamable polymer surrounding and in intimate contact with the inner layer in the plane of the support member.

6. The article of claim 4 where the layers of the sealing member comprise the same polymer.

7. The article of claim 4 where the crosslinked foamable polymer is a radiation crosslinked foamable polymer.

8. The article of claim 4 where the layers of the sealing member are formed from separate pieces of polymer.

9. The article of claim 4 where the support member and/or the sealing member are provided with engagement means for securing the support member to the sealing member.

10. The article of claim 4 where the article has a thickness between 3 mm and 13 mm.

11. The article of claim 10 where the article has a thickness between 5 mm and 10 mm.

12. The article of claim 4 where the article has a shape corresponding generally to the cross-section of the cavity.

13. The article of claim 12 where the article has linear dimensions that are between 2 mm and 16 mm less than the linear dimensions of the cross-section of the cavity at the predetermined location.

14. The article of claim 13 where the article has linear dimensions that are between 6 mm and 10 mm less than the linear dimensions of the cross-section of the cavity at the predetermined location.

15. The article of claim 4 where the support member has a cross-sectional shape corresponding generally to the cross-section of the cavity at the predetermined location.

16. The article of claim 4 further comprising means for locating the article within the cavity at the predetermined location.

17. The article of claim 16 where the locating means comprises a mounting member secured to the article and adapted to fit within and interact with the cavity such that, when the article is placed at the predetermined location the mounting member locates and orients the article within the cross-section at the predetermined location.

18. The article of claim 4 where the sealing member comprises two portions positioned about the support member in spaced-apart relationship so that, when the article is placed at the predetermined location within the cavity and the sealing member is foamed, the two portions of the foamed outermost layer are forced into intimate and sealing contact with the cavity walls in spaced-apart relationship, thereby providing a dual seal.

19. A cavity sealing article for use in a longitudinally extending cavity defined by cavity walls, the cavity having a cross-section within the cavity walls which is to be sealed at a predetermined location, the article comprising:

(a) a planar support member; and (b) a sealing member comprising a foamable polymer surrounding and in intimate contact with the support member in the plane of the support member, the sealing member comprising an inner layer, a middle layer, and an outer layer, in the plane of the support member, the inner layer comprising an uncrosslinked polymer surrounding and in intimate contact with the support member in the plane of the support member, the middle layer comprising a crosslinked foamable polymer surrounding and in intimate contact with the inner layer in the plane of the support member, and the outer layer comprising an uncrosslinked foamable polymer surrounding and in intimate contact with the middle layer in the plane of the support member, the article having a size and shape such that the article incompletely occupies the cross-section of the cavity at the predetermined location and the sealing member of the article having expansion and scaling properties such that, when the article is placed at the predetermined location within the cavity and the sealing member is foamed, the foamed outer layer is forced into intimate and sealing contact with the cavity walls.

20. The article of claim 19 where the inner layer comprises an uncrosslinked foamable polymer.

21. The article of claim 19 where the inner layer comprises an uncrosslinked polymer that is not foamable.

* * * * *